3,349,012
POTENTIOMETRIC SENSOR WITH
PRESATURATOR
Cyril Solomons, Edina, Minn., assignor to Honeywell Inc.
a corporation of Delaware
Filed Feb. 13, 1964, Ser. No. 344,575
4 Claims. (Cl. 204—1)

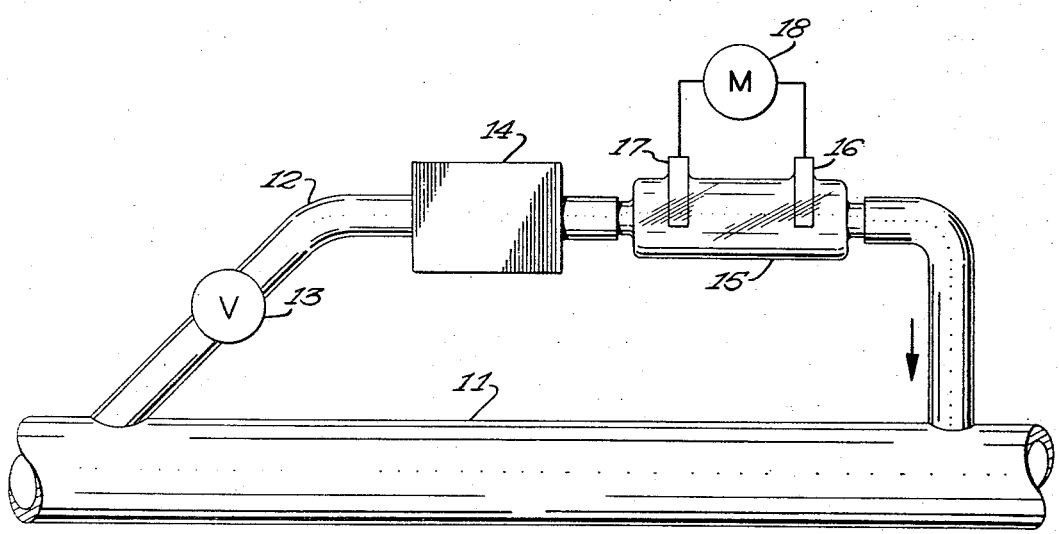

The present invention is directed to an electrochemical cell and more particularly to a potentiometric type cell using electrodes of the second kind. In potentiometric type cells using electrodes of the second kind, the concentration of an anion in a solution is determined in accordance with the potential generated as a result of the insertion of a metal electrode into the solution containing a sparingly soluble salt including a metal ion of the electrode and the given anion. The most well-known cell of this type is the silver-silver chloride type cell useful in the determination of the concentration of chloride ion in a solution. In cells of this type, the concentration of the chloride ion is determined indirectly as a function of the concentration of silver ion solubilized in the test fluid. In the calculations the quantity "solubility product" is utilized in accordance with the following general formula:

(1) $\quad [Ag^+] = Ksp/[Cl^-]$

From this solubility product equation, one can readily see that the silver ion concentration in a solution at equilibrium is dependent upon the concentration of chloride ion. When the potential of a system using a half cell of silver-silver chloride is determined against some reference electrode, the potential will vary in accordance with the Nernst equation as indicated below:

(2) $\quad E_{cell} = E_o + 0.059 \log [Ag^+] = E_o - 0.059 \log [Cl^-]$

Two serious problems are presented by the use of a simple cell system such as described above. First, the presence of interfering ions pill give false readings. For example, if one were to determine concentration of chloride ion in a solution which contained 0.01 normal chloride ion and also contained 0.01 normal bromide ion, one would get an apparent reading of 0.61 chloride ion due to the fact that silver bromide is markedly less soluble than is silver chloride. A second major drawback of such cells is that in some of the desired uses, such as in flowing water, the silver chloride layer, which must be on the surface of the silver metal electrode, is removed by the passing of water in spite of its relative insolubility. This necessitates periodic replacement of the electrode and further requires relatively thick coatings of silver chloride over the electrode to give it a useful life. This latter requirement slows down the time response of such electrodes.

My invention provides a means for overcoming both the inherent inaccuracies of mixed ion determination and also of the attrition of the electrodes. It will likewise provide far more rapid response than the electrodes of the prior art. This is accomplished by the use of a low solubility salt in a presaturator system installed between the sample to be tested and the actual test chamber. In the example of chloride ion determination, the presaturator would contain a substance such as silver chloride.

The invention will be best understood from the study of the following description and drawings wherein:

FIGURE 1 is a schematic illustration of one form of the present invention.

In FIGURE 1 there is ilustrated a potentiometric analysis system in accordance with the present invention. While the device of the present invention is suitable for use in measuring ion concentration in static systems, it will be most useful in the measurement of ion concentration in flowing systems. In FIGURE 1, there is illustrated a main pipe line 11 having located at some point thereon a sampling pipe 12 with a valve 13. The sample to be tested, after passing through valve 13, goes through a presaturator 14 containing a low solubility salt as will be described in greater detail below. The presaturator is simply a chamber containing a mass of an insoluble salt described more fully below. After the test sample has passed through the presaturator it enters a measuring cell, designated generally 15, having therein a reference electrode 16 and a test electrode 17. Measuring means 18 are provided to determine the electrical characteristics.

The selection of the metal for the test electrode 17 will be dependent upon the ion being analyzed for. In the instance of chloride ion, the electrode 17 will, for example, be silver metal. In this instance, the presaturator will contain silver chloride in solid form. The reference electrode may be any of those conventionally used in such cells. A mercury/mercurous sulfate half cell would be satisfactory.

The test fluid upon passing through the presaturator will solubilize silver ion in accordance with the general Formula 1 given above. That is, the higher the concentration of chloride ion, the lower will be the resultant concentration of silver ion entering chamber 15. If there is no chloride ion contained in the test fluid, the solubility of the silver ion will be approximately $10^{-5}$ mols per liter. Thus, the test cell will "see" a solution containing a quantity of silver ion which is directly related to the concentration of chloride ion in the incoming water being tested. Thus, there is no need for a film of silver chloride on the surface of the test electrode and the response of the electrode can be greatly enhanced over those electrodes composed of silver-silver chloride. Likewise, due to the lack of need for a silver chloride layer, the electrode will not be altered by the passing test liquid and will thus have an indefinite life.

While the above description is to the determination of chloride ion, other insoluble salts of silver may be used to determine other ions—e.g., silver iodide for iodide, silver bromide for bromide, etc.

The above description of the analysis system in accordance with the present invention is for the simple case of an incoming fluid containing only chloride ion. In the instance where the incoming fluid contained some ion which would normally interfere with the determination of chloride ion—such as bromide or iodide—the presaturator will remove these ions and replace them with equivalent numbers of chloride ions. This will occur in accordance with the solubility of the respective silver salts. While this will introduce an error in the reading of the instrument, the error will be additive of the total concentration of the chloride ion plus any interfering ions. The accuracy will not be influenced to the extent indicated above in the general remarks on the effect of bromide ion.

The invention is equally applicable to the determination of other ions utilizing other metal test electrodes. For example, if the determination desired is for sulphate ions, then the test electrode may conveniently be of lead metal with the presaturator containing a material such as lead sulphate. In a system of this type, the concentration of lead ion in a test chamber will be dependent upon the concentration of the sulphate ion in the incoming fluid. The electrical potential read by meter 18 would thus be proportional to the amount of lead ion in the sample water coming from the presaturator. Mercury metal electrodes can also be used in determination of many anions. The presaturator would in this instance contain the insoluble mercury salt of the anion. The anion could be, for example, iodate, chloride, iodide, etc.

Other ions may be analyzed for in a similar manner with the choice of electrode metals being dictated by questions of possible interfering ions and by considerations of solubilities. The general principle will, however, be the same as has been described above. Such matters will be readily apparent to those skilled in the art.

Having thus described my invention, I claim:

1. A system for determining the concentration of an anion dissolved in a fluid comprising:
   (a) a measuring cell including a reference electrode and a measuring electrode, said measuring electrode consisting of a metal whose salt of the anion being sought is relatively insoluble,
   (b) measuring means for determining the potential between said reference electrode and said measuring electrode,
   (c) a presaturator comprising a chamber having therein a solid mass of a salt of the metal of said measuring electrode and the anion being sought,
   (d) means for passing the fluid to be tested through said saturator so as to substantially saturate the fluid with the salt,
   (e) means for passing the saturated test fluid into said measuring cell.

2. The method of measuring the concentration of an anion dissolved in a fluid comprising:
   (a) saturating the fluid to be tested with a relatively insoluble salt of a metal and the anion being sought by placing the sample in contact with an excess of said salt in solid form,
   (b) inserting said saturated sample into a measuring cell including a reference electrode and a measuring electrode, said measuring electrode being composed of the metal of said insoluble salt,
   (c) measuring the potential between said reference electrode and said measuring electrode.

3. A system for determining the concentration of chloride ion dissolved in a fluid comprising:
   (a) a measuring cell including a reference electrode and a silver metal measuring electrode,
   (b) measuring means for determining the potential between said reference electrode and said measuring electrode,
   (c) a presaturator comprising a chamber having therein a solid mass of silver chloride,
   (d) means for passing the fluid to be tested through said presaturator so as to substantially saturate the fluid with silver chloride,
   (e) means for passing the saturated test fluid into said measuring cell.

4. A system for determining the concentration of sulfate ion dissolved in a fluid comprising:
   (a) a measuring cell including a reference electrode and a lead metal measuring electrode,
   (b) measuring means for determining the potential between said reference electrode and said lead electrode,
   (c) a presaturator comprising a chamber having therein a solid mass of lead sulfate,
   (d) means for passing the fluid to be tested through said presaturator so as to substantially saturate the fluid with lead sulfate,
   (e) means for passing the saturated test fluid into said measuring cell.

References Cited

UNITED STATES PATENTS 2,930,967   3/1960   Laird et al. _____ 204—195

HOWARD S. WILLIAMS, *Primary Examiner.*

T. H. TUNG, *Assistant Examiner.*